Dec. 9, 1941. R. M. BERGSTEIN Re. 21,971

PACKAGING STRUCTURE

Original Filed March 2, 1936 2 Sheets-Sheet 1

INVENTOR.
ROBERT MORRIS BERGSTEIN.
BY Allen & Allen
ATTORNEYS.

Dec. 9, 1941. R. M. BERGSTEIN Re. 21,971

PACKAGING STRUCTURE

Original Filed March 2, 1936 2 Sheets-Sheet 2

INVENTOR.
ROBERT MORRIS BERGSTEIN.
BY Allen & Allen
ATTORNEYS.

Reissued Dec. 9, 1941

Re. 21,971

UNITED STATES PATENT OFFICE 21,971

PACKAGING STRUCTURE

Robert Morris Bergstein, Cincinnati, Ohio, assignor, by mesne assignments, to Frank David Bergstein and himself, as trustees Original No. 2,170,364, dated August 22, 1939, Serial No. 66,650, March 2, 1936. Application for reissue April 23, 1940, Serial No. 331,263

3 Claims. (Cl. 229—55)

My invention relates to packaging devices in the form of bags or cartons containing bags designed particularly for air-tight, liquid and moisture-tight packing. The present invention is part of the development shown and described in other aspects in my Letters Patent Nos. 2,154,083, granted April 11, 1939; 2,097,427 granted Nov. 2, 1937; and 2,099,257 granted November 16, 1937.

This is a reissue of my Letters Patent No. 2,170,364, dated August 22, 1939.

In my development of packaging devices and manufacturing methods for making them, as disclosed in the patents above noted, I have been directing my attention to the provision of a package which will to a maximum degree, exclude moisture, liquid, and be gas and air tight when the product to be packed is installed therein. It is also directed to the provision of such a package which can be used easily in familiar carton-filling or bag-filling machining methods, and which is cheap to manufacture, and inexpensive to use.

One of the main objects in the development is to provide a package which can be used for satisfactory carrying liquids, such as oils and milks and other liquids, and can also be used for packing, primarily, food products, by first evacuating the air from such containers by means of filling such container with an inert gas, such as carbon dioxide, and thereafter filling such container with the contents, thus resulting in a container being filled with the contents plus an inert gas minus air, the oxygen in which being largely responsible for the deterioration of foods. It will be obvious that contents thus protected will have a protection similar to that offered by a vacuumized tin or glass container, at a fraction of the cost of such container.

A part of my said development has been the provision of a bag which is preferably in the form of a tube seamed by heat fusion, and preferably this bag is built into a carton having relatively stiff or rigid walls. Incident to the development is the sealing by heat fusion of the one end of the bag and provision for subsequent sealing by heat fusion of the open end of the bag. In this way the contents of the package is surrounded by an integral body of material which naturally is as impermeable to gas and moisture transmission as is possible. In this way also, it is practical to install in a carton a bag which is at least as large around as the enclosing walls of the carton, and preferably fastened to the carton, thus assuring that the bag itself does not have to sustain the stress and strain of its contents at any point unassisted by the surrounding members of the package.

Among other materials which I employ in connection with my packaging development are materials which are very impermeable to gas and liquid and moisture penetration and in addition are heat fusible in and of themselves, without the necessity of using a heat fusible medium for the seams. Such materials are more impermeable than any others of a flexible nature and light in weight, which are practical for use in inexpensive packaging of commodities. Their very great advantage in permitting a rapid inexpensive tightly sealed closure is obvious.

Such a material which I have found very advantageous, is a thin rubber composition of which a type is sold under the name Pliofilm. Other materials highly impermeable, and thin and heat-fusible are, however, available. There are several difficulties attendant upon the use of such materials arising from the fact that they are flimsy, and must be handled carefully both in building the package and filling and sealing it.

To form an air or liquid tight bag of such material as "Pliofilm" by itself is a difficult operation, since a tiny speck of dust in the bag-making apparatus is likely to puncture it. Also incident to such material is a rapid softening under heat so that attempts to seal it by heat fusion are likely to so attenuate the portions being heated as to cause a break or an incipient break in the material.

Accordingly it is one of the objects of the present invention to protect the web of thin heat-fusible material during the formation of the bag and the final closure thereof by a web of heavier material. In this way the feeding of the bag-forming materials can be facilitated, and the application of heat can be done through the heavier material, thus avoiding any excessive pressure, and cushioning any pressure where pressure is used, to prevent crushing or attenuating the heat-fusible material.

It is another object of the invention to provide a bag or package containing a bag, which bag has internally thereof a complete integral web of thin heat-fusible material, which is flexible, and strong, all of the seam of said internal member being fused by heat, but which bag has all of the strength which is required due to the use of a heavier, and less expensive covering preferably of usual bag-forming paper.

The improvements and advantages resulting from such a structure include the following:

(a) Because of its relatively greater cost a fusible material of highly resistant nature to gas and liquid penetration such as Pliofilm, which I use as an example, is preferably used in its thinnest form. By introducing the exterior reinforcing ply of paper it is thereby possible to make use of such a material or sheeting in a thinner form than would otherwise be practical.

(*b*) Due to its flexible nature such material is extremely susceptible to puncturing or rupturing while it is being drawn through the bag machine, so that the outer reinforcing ply offers protection to the fusible film during the course of manufacture of bags therefrom.

(*c*) The application of heat to a seam formed of such material causes the heated portion to become quite plastic during the time of fusing, increasing its normal susceptibility to puncturing or distortion, and by the introduction of an exterior reinforcing ply the heat can be applied through the exterior ply, effectively preventing such distortions or punctures.

(*d*) I have discovered that in applying heat to fuse such material the mere contact of the portions to be fused alone is all that is required and that further pressure is not necessary. In fact satisfactory fusion can be effected by retaining contact of overlapped edges by guides, so that radiant heat will fuse the edges without the heating element contacting the material.

(*e*) The finished bag can be handled, opened and packed more readily than would be possible without the paper reinforcing ply because it possesses the handling qualities of a paper bag instead of the extreme flimsiness and pliability which characterize a bag made of thin heat-fusible material alone.

It is very important that an adhesive be used to combine the plys that will not harden or become brittle, so that when the bag is opened for filling or is folded after being filled any such folds will not have a tendency to crack or break the fusible material which would be the case if the adhesive became brittle or hardened. I have discovered that by using a rubber latex adhesive I secure a very good bond between the plys and because the rubber-like adhesive remains permanently pliable, it permits folding and handling without injury to the fusible ply. Further, the use of such rubber-like adhesive serves to fill effectively any slight pinholes or punctures that there might be in the fusible film and furthermore through the use of this type of adhesive the resistance to gas or liquid penetration is increased considerably beyond that which the fusible film alone possesses. Incidentally any objectionable odor of the adhesive film is blocked off by the internal ply.

It should be noted that the bag of my present improvement when housed in a carton in accordance with other aspects of my development, referred to in my applications above identified, will be fully effective, in place of the bags which I have described in those applications.

I will describe my invention with reference to several examples only, and showing but one form of bag, and in the claims that follow will state the novelty inherent in the said disclosure. I will not endeavor to re-state matters which are brought out in my said issued patents, since I consider them interdependent with the present features of the development, although in some respects there are aspects of the said patents which are not so important in the present case, as reference to the claims hereto appended will show.

Figure 1:
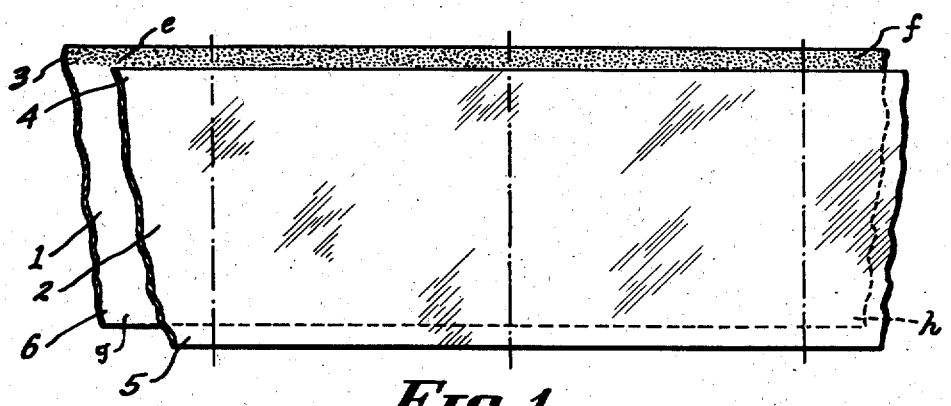
Fig. 1 is a plan view showing an arrangement of a heat-fusible ply and backing ply convenient for use in following my invention.
Figure 2:
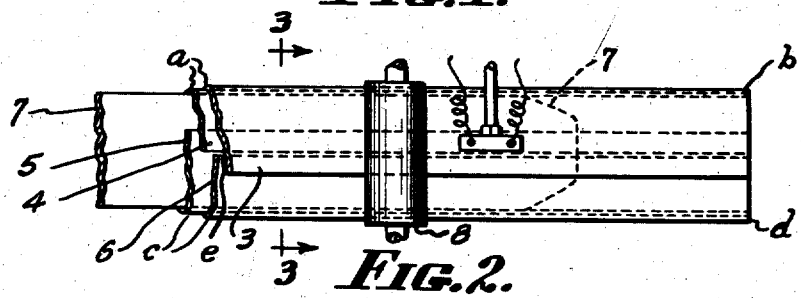
Fig. 2 illustrates a mode of forming such a strip as shown in Fig. 1, into a tubular structure.
Figure 3:
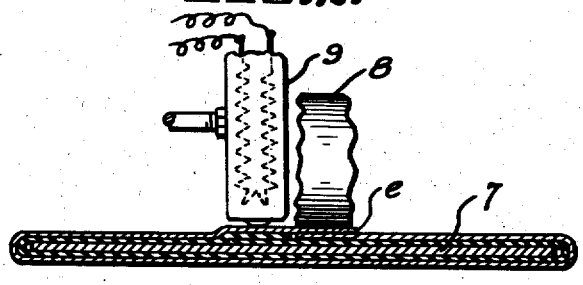
Fig. 3 is a section on the line 3—3 of Fig. 2.
Figure 5:
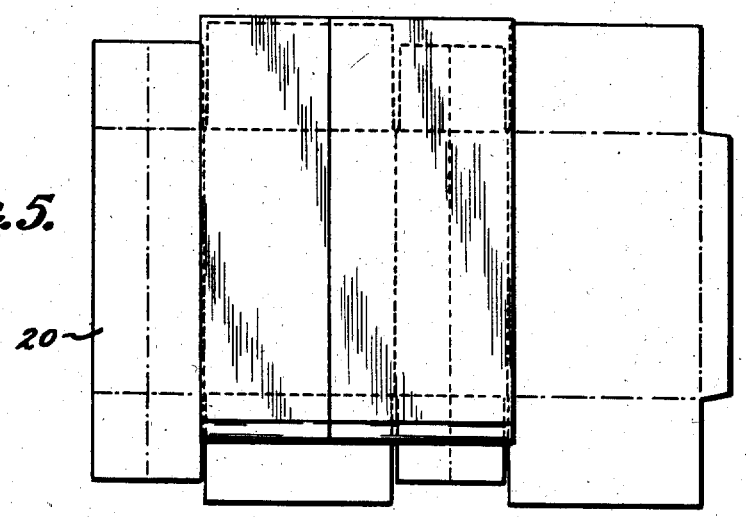
Fig. 5 is a diagram showing the mode in which the bag may be housed in a carton during the operation of folding and cementing the carton.

In the drawings, a flat piece, or sheet of paper 1 has a sheet 2 of thin flexible heat-fusible material positioned on it so that the edge 3 of the paper sheet extends out laterally from the parallel edge 4 of the material. At the other side of the sheets the edge 5 of the sheet 2 extends out beyond the edge 6 of the paper. Preferably the two webs are united by a layer of latex (not shown) which acts as an adhesive to join them together. Some other cement might be employed although it should preferably be permanently flexible. In some instances bands or spots of cement can be used or none at all.

The two sheets are folded together over a folding plate 7 along the lines *a—b*, *c—d*, and, as will be noted from the sectional views, the edge 4 of the sheet 2 overlaps the opposite edge 5 of the said sheet. The edge 3 of the paper will also overlap the opposite edge 6 of the paper sheet. The folding plate is interposed between opposite walls of the folded material.

An adhesive is applied along one of the meeting surfaces of the paper sheet as indicated at *e—f*, or it may be applied to the under surface of the corresponding meeting surface (the marginal portion *g—h*), or the meeting surfaces of the paper sheet may be coated with a rubber latex adhesive which on pressing together will form a firm overlapping joint resulting in the cohesion of one edge of the paper cover to its opposed edge in a lap seam joint.

It will be noted that the two joints, that is the paper joint and the joint in the sheet 2 of flexible heat plastic material, are preferably not in registry and pressure which causes adhesion of the edges of the paper sheet as by a roller 8, is not required to join the edges of the sheet 2.

The edges of the sheet 2 may be fused together in an overlapped joint by bringing the tube into proximity of a heating unit such as is indicated at 9, and which may be heated by whatever temperature is required for fusion. With the sheet folded flatwise in bag formation the overlapped edges can be caused to fuse together either by contact with the heating unit or by locating the heating unit close to the overlapped edges. The folding plate being interposed between the opposite wall, prevents fusing the inner sheet except at the seam.

I find that the fusion of the inner sheet without the use of pressure and without a heated pressure roller or bar applied directly to the seam is preferable as it avoids any tendency to buckle and curl up. The heat also makes a better lapped seam joint through the thickness of one ply of paper than would occur were the fusible web to be exposed to a direct heat.

Figure 4:
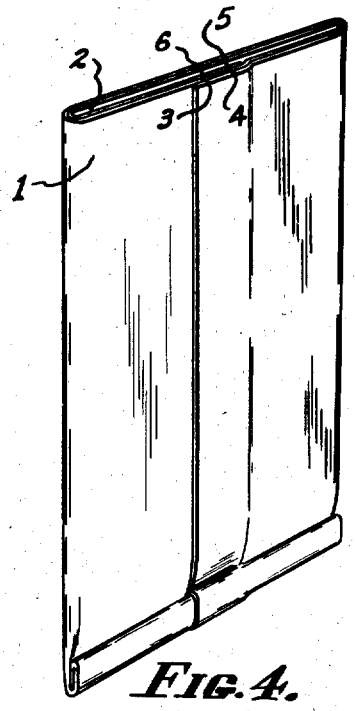
Fig. 4 shows in perspective a bag formed of a section of the tubular structure, wherein the one end thereof is sealed by heat fusion by means of heat applied to a zone across the end of the bag.

The plural-ply tubular section is then heated by the application of heat in a band laterally across the sheet to form a securely fused end seal joint and the material may be at this point cut into sections, completing the bag. If desired the closed end may be folded over double and secured with adhesive, as shown in Figure 4 and in accordance with the method shown in the application of Samuel Bergstein, Serial No. 515,275, filed Feb. 12, 1931, now Patent No. 2,074,886, March 23, 1937. If this is done the heat-sealing may be a subsequent operation. Double folding has the advantage of keeping any strain off of the sealed end.

Purely hand manipulation in the various steps of the above method will be readily applicable, although carrying out of the steps by the use of available automatic machinery is of course, the best mode of practice.

A bag machine can be modified to operate very rapidly using the method above outlined. The plural ply tube is formed over a forming plate, from the two webs of material which may be adhesively secured together by a preliminary operation. The usual folding elements will act to form the double thickness tube, and supply the adhesive to the outer ply, or moisten or heat the adhesive if it has been previously applied. After the tube is formed and the outer seam formed, the heat contact element to provide for fusing the inner seam is traversed by the material.

Thereafter, the tube may be cut to length and its direction of movement changed from the previous direction of travel and one cut end of the tube caused to pass a heating element to bring about a fusion of the inner ply at that end. As an alternative the tube may be conveyed in a straight line and have a timed heating element engage it lightly crosswise, to bring about a fusion along what will be the bottom, and thereafter it may be cut. The fused zone need not be wide and the operation is very rapid even through the outer layer. The result in either event is a tubular bag with its inner surface fused into an integral body except at one end.

An alternative method of forming the novel bag is to form a tube of the flexible heat-plastic material over the folding plate and when it is formed bring the paper web up around the plate into overlapping arrangement surrounding the heat-plastic tube, in which instance the seams in the inner and outer tubes can be in line with each other. The adhesive juncture of the two webs together can be accomplished during this operation, if desired, and the cementing of the seam in the outer ply and the inner ply accomplished in the same manner as already described. The lengthwise seam of the heat-plastic ply may be formed before the outer ply is wrapped around the forming plate, although this is not usually desirable, unless the heat-plastic material is quite thick. I find that a better seal is brought about, in all cases, where materials of the type referred to are used, and the inner web becomes exceedingly soft under high heat, to have the protective outer web present, because it serves to prevent crinkles, and pinholes.

I have shown the bag, as now described, when employed in connection with a carton. The carton blank 20 cut and scored is provided with glue spots or bands to receive the bag, which can be provided for by automatic machinery, and as shown it is preferable for the bag to be larger around than the interior of the carton, or of substantially the same dimension, wherefore it will overlap slightly the combined face and side wall on which it is deposited, as illustrated. It will also extend beyond the walls of the carton as illustrated, at the open end, and somewhat beyond the juncture of the closing flaps with the walls of the carton at the closed end. The carton is then folded and cemented about the bag.

The features incident to this mode of operation and the resulting structure are brought out in my above mentioned patents, but it should be noted that the manufacturing operation is easier because of the strength and body of my present bag.

I have shown both the bag by itself and the bag in a carton ready for insertion of contents. It will be understood from my above mentioned patents that when the bag is filled in either instance, it is ready for sealing as by stretching out the exposed mouth, and applying heat to fuse the walls together. The outer ply of the bag serves here again as a protection during the sealing operation and here again pressure by the heated element is avoided.

Figure 6:
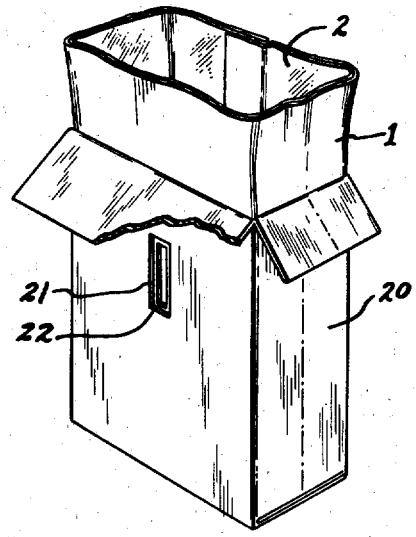
Fig. 6 shows in perspective a carton containing the bag and opened for reception of the contents, with an observation panel left in the outer ply of the bag and in the carton.

I have illustrated in Fig. 6, a carton which has a window 21 cut therein, and there will be a like window 22 formed in the outer web of paper of the bag. This window as shown is narrow but will permit of a view of the contents of the package without weakening it substantially. The cream line in a milk container constructed as has been described can be viewed through such an opening.

Another way of combining the present bag with a carton as a unit package, would be to form the bags first, place them in a hopper and in a subsequent operation combine them with carton blanks, after the manner already indicated.

In comparison with my above mentioned patents, the necessity of avoiding any re-entrant folds in the seam or transverse fusion of the bag is not so important where the inner ply is as readily fusible, as for example the Pliofilm material which I have mentioned, particularly where it is united with the outer ply by means of an intervening film of latex.

While I have pointed out the advantages of the aspect of my development disclosed herein, it may be noted that bag-filled cartons constructed according to my preferred arrangement have passed through gruelling tests against both leakage of water and milk, and leakage of carbon dioxide gas, under severe mishandling without being broken or leaking.

Having thus described my invention, what I claim as new and desire to secure by Letters Patent is:

1. A plural ply open-mouthed bag comprising an inner ply of heat-fusible material and an outer ply of other flexible material, said inner ply having an interior of integral nature with two of its seams formed by fusion, at least one of said fused seams being transverse the bag and being faced on both sides by the outer ply secured thereto, each ply in said bag being seamed longitudinally to itself without interposition of the other ply.

2. A plural ply open-mouthed bag comprising an inner ply of heat-fusible material and an outer ply of other flexible material adhered thereto by an interposed layer of flexible adhesive, said inner ply having an interior of integral nature with two of its seams formed by fusion, at least one of said fused seams being transverse the bag and being faced on both sides by the outer ply secured thereto, each ply in said bag being seamed longitudinally to itself without interposition of the other ply.

3. A plural ply open-mouthed bag comprising an inner ply of heat-fusible material and an outer ply of other flexible material, said inner ply having an interior of integral nature with two seams formed by fusion, the lengthwise seam of the inner ply being an overlapped fused seam and the end seam thereof being a face to face fusion of said inner ply across a zone of said ply, which is faced on both sides by the outer ply secured thereto, and the lengthwise overlapped fused seam of the inner ply being faced on but one side with the outer ply each ply in said bag being seamed longitudinally to itself without the interposition of the other ply.

ROBERT MORRIS BERGSTEIN.